Inventor:
Daniel C. Heitshu

Feb. 27, 1951 D. C. HEITSHU 2,543,319
SELF-PROPELLED VEHICLE WITH ARTICULATE FRAME
SECTIONS AND POWER PLANT SUPPORT
Filed Nov. 14, 1947 3 Sheets-Sheet 3
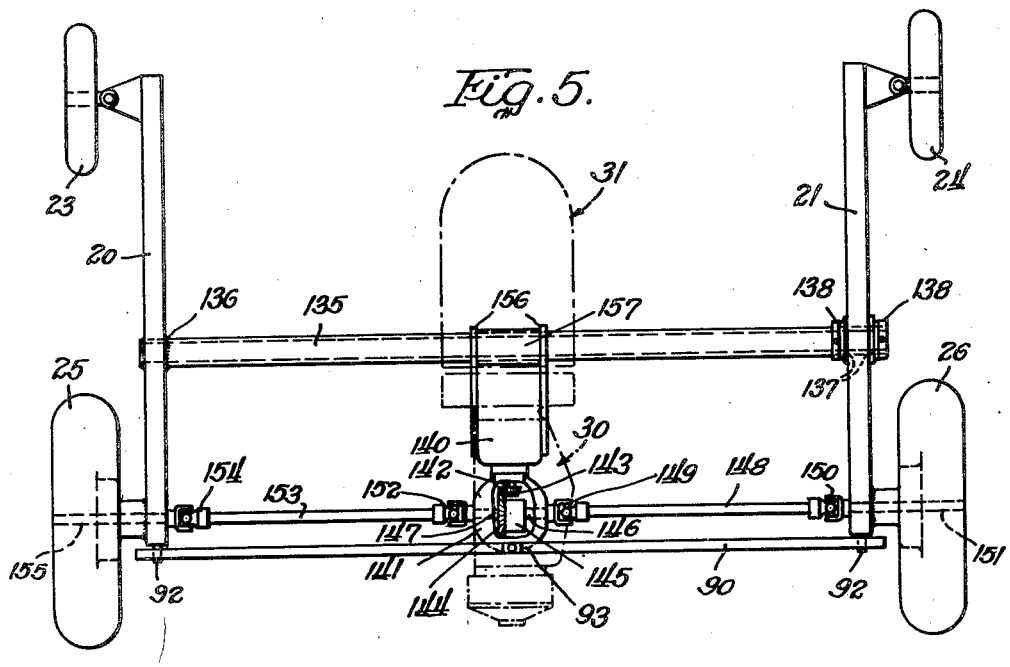
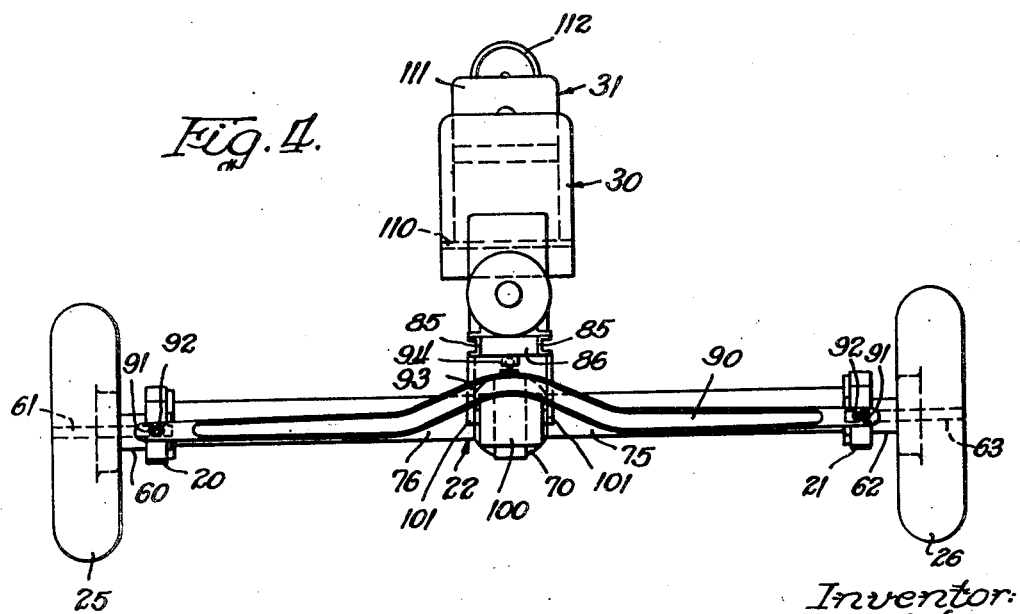
Inventor:
Daniel C. Heitshu.

Patented Feb. 27, 1951

2,543,319

UNITED STATES PATENT OFFICE 2,543,319

SELF-PROPELLED VEHICLE WITH ARTICULATE FRAME SECTIONS AND POWER PLANT SUPPORT

Daniel C. Heitshu, Moline, Ill., assignor to Deere & Company, Moline, Ill., a corporation of Illinois Application November 14, 1947, Serial No. 785,961

6 Claims. (Cl. 180—1)

This invention relates to a new and improved vehicle especially adapted for agricultural purposes and is principally designed from the standpoint of providing a flexible frame to which may be attached or on which may be carried a variety of agricultural implements, particularly implements or machines of the harvester type.

In the past a great deal of design effort has been centered on providing agricultural implements especially adapted for attachment to or mounting on tractors of existing types. In many cases the program has been eminently successful, the only disadvantage being that in many cases the use of a particular implement with a tractor is tantamount to withdrawing the tractor from use for other purposes because of the difficulty with which the implement is dismounted therefrom. In some instances the complicated nature of the implement or the means for attaching the same to or mounting the same on the tractor virtually prevents convenient disassembly of the two units, in which case the owner of the tractor and implement is compelled to provide himself with an additional tractor, obviously at considerable additional expense. In other instances the special design of the implement to adapt the same for attachment to or mounting on the tractor detracts somewhat from the efficient operation of the machine as a unit and the inefficiency must be disregarded as compensated for by the desirability of operation of the tractor and implement as a unit.

According to the present invention, it is an important object to provide an inexpensive vehicle frame which will take the place of a tractor for carrying implements. To this end, many of the expensive design features of a tractor may be eliminated and the frame of the vehicle may take the form of a relatively simple frame structure including a power plant for propelling the same and for driving the moving parts of any agriculture machine that is attached thereto or mounted thereon.

Another object of the invention relates to the provision of a vehicle frame structure in which a structural part of the frame also serves as means for carrying an agricultural implement or machine. In this respect it is also contemplated, in one form of the invention, that the structural members serve also to carry or enclose driving means for the traction wheels of the vehicle. An important feature of the invention is to provide a frame that is flexible for the purpose of accommodating vertical movement of the frame components relative to each other as the wheels follow varying ground contour. In another aspect, the invention involves the mounting of a power plant and an operator's station on the frame in such manner as to accommodate flexing of the frame components.

The foregoing and other important objects and features of the invention will become apparent as the disclosure thereof is more fully made in the following detailed description, taken in conjunction with the accompanying sheets of drawings wherein there are shown, by way of example, two preferred forms of the invention.

In the drawings:

Figure 4 is a rear end view of the vehicle frame, the harvester having been omitted from the drawing; and Figure 5 is a plan view of a modified form of frame, shown without the harvester or similar implement attached thereto.

Figure 1:
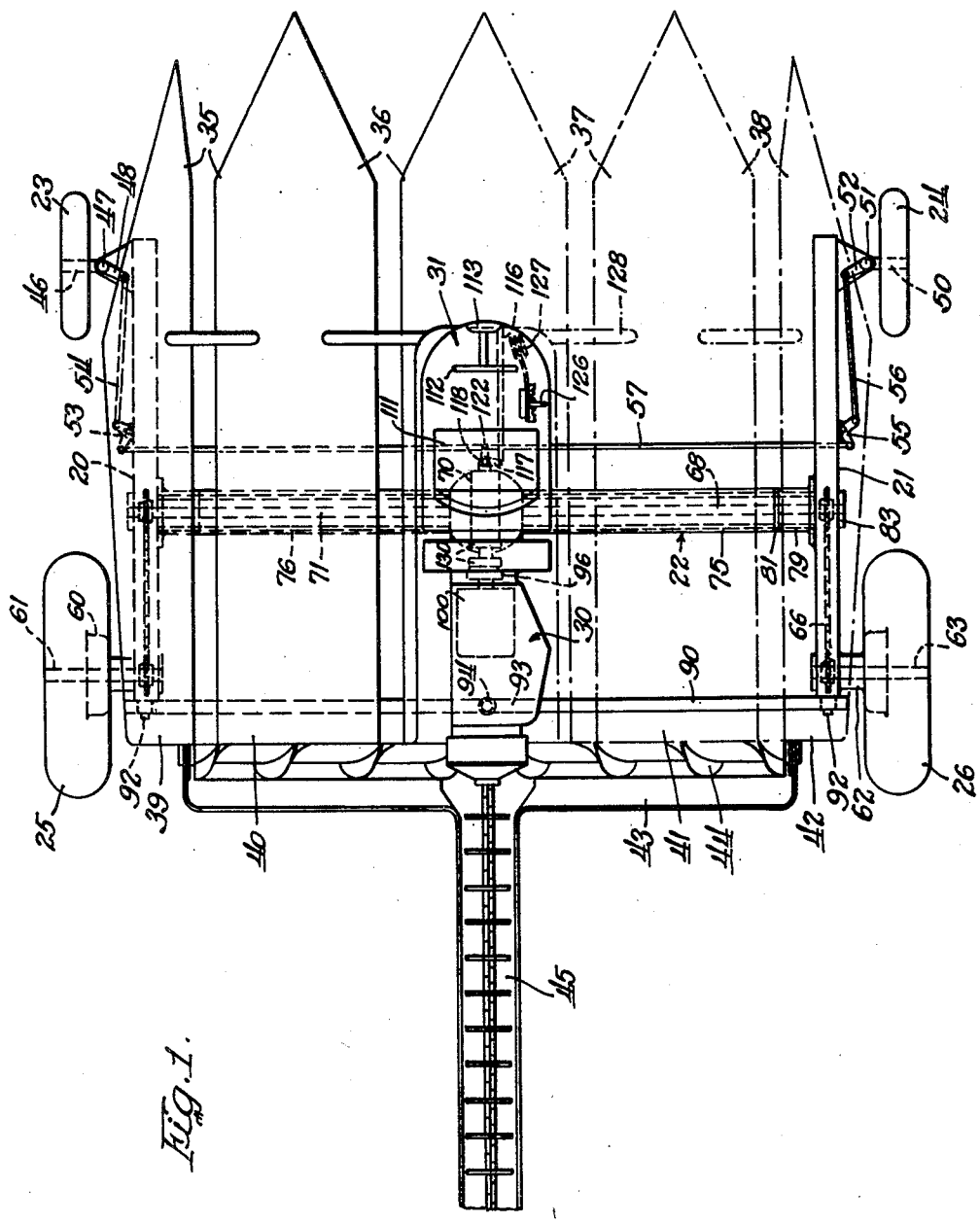
Figure 1 is a plan view of one form of a vehicle frame shown as carrying a harvesting implement of the corn picker type.

The form of the invention shown in Figures 1–4 may be generally described as consisting of a vehicle frame substantially in the form of an H made up by a first fore and aft extending side member 20, a second fore and aft extending side member 21 and a transverse or cross member 22, these members respectively forming the legs and crossbar of the H. The forward end of the side member 20 is carried on a wheel 23 and the forward end of the other side member 21 is similarly carried on a wheel 24; the side member 20 is carried at its rear end on a traction wheel 25, and the rear end of the other side member 21 is similarly carried on a traction wheel 26, these wheels providing ground-engaging means for sustaining the frame. The frame is further provided with a power plant or unit 30 for supplying power to the traction wheels 25 and 26. An operator's station 31 is carried by the frame just ahead of the power plant 30 and is provided with controls for operating the vehicle, details of which will be set forth subsequently. In the present disclosure the vehicle frame is shown as carrying a crop harvester of the corn picker type, here shown as a four-row picker including gathering units 35, 36, 37 and 38. These units may be carried in any desired manner on the transverse or cross member 22. These units include rearwardly and upwardly extending elevator housings 39, 40, 41 and 42, respectively, for delivering gathered crops to a transversely extending hopper 43 in which is located a transverse auger 44, intermediate the ends of which is located the receiving end of a rearwardly and upwardly inclining wagon elevator 45. The details of the harvester illustrated form no particular part of the invention and can be replaced with any other suitable construction, as desired. Similarly, the entire harvester may be replaced with any other implement or machine, the substitution of which for that shown will readily occur to those skilled in the art. Accordingly, the illustration of the harvester structure is rather schematic.

The wheels 23 and 24 are dirigible or steerable so that the direction of travel of the vehicle can be controlled. This arrangement is accomplished by the provision for the wheel 23 of a stub axle 46 including a vertical spindle 47 at the upper end of which is a steering arm 48. The wheel 24 is rotatably carried on a stub axle 50 including a vertical spindle 51 at the upper end of which is carried a steering arm 52. A portion of the steering control means for the wheels 23 and 24 is carried by the side members 20 and 21. The member 20 includes intermediate its front end and the point of connection with the transverse member 22 a bracket on which is mounted a bell crank 53. One arm of the bell crank is connected by a forwardly extending link 54 to the steering arm 48. The other side member 21 carries a bracket on which is pivoted a bell crank 55, one arm of which is connected by a forwardly extending link 56 to the steering arm 52. The other arms of the bell cranks 53 and 55 are cross connected by a transverse tie rod 57, the control of which is influenced by mechanism at the operator's station 31, the details of which will be set forth below.

Figure 3:
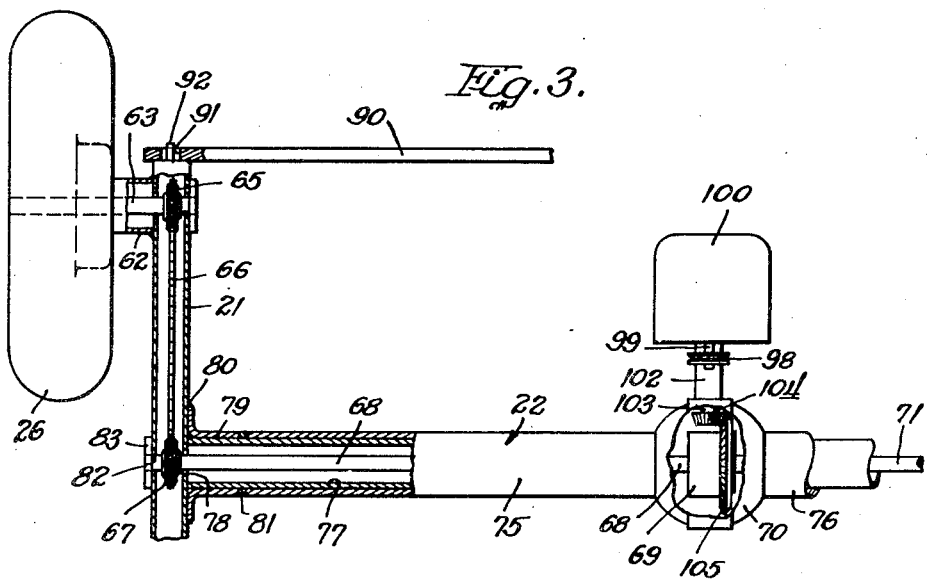
Figure 3 is a fragmentary plan view, on an enlarged scale and partly in section, showing the relationship between certain frame components and driving means between the power source and one of the section wheels.

The rear end of the left hand side member 20 includes a wheel housing 60 in which is journaled a drive axle 61 for the traction wheel 25. The rear end of the right hand side member 21 is similarly provided with a wheel housing 62 which journals a drive axle 63 for the traction wheel 26. As best shown in Figure 3, at least the rear portion of the right side member 21 is preferably of tubular construction to form a housing for driving means to be presently described. At least the rear portion of the left hand side member 20 is similarly provided, and it will be understood from the description to follow that both side arms are the same at their rear end portions. Figure 3 shows that the drive axle 63 for the traction wheel 26 extends into the tubular portion of the side member 21, and within this tubular portion the axle 63 has keyed thereto a driving sprocket 65. A driving chain 66 is trained about the sprocket 65 and extends forwardly within the tubular portion of the member 21 to be trained about a driving sprocket 67 keyed to the outer end portion of a transversely extending shaft 68 housed within the member 22, which is likewise preferably of tubular construction. The inner end of the shaft 68 is appropriately associated with differential drive mechanism, designated generally by the numeral 69 and carried within a gear casing 70 provided intermediate the ends of the transverse member 22. A second drive axle 71 coaxial with the drive axle 68 has its inner end suitably associated with the differential mechanism 69 and extends laterally outwardly to the left side of the vehicle, at which point it is associated with sprocket and chain driving mechanism, similar to that previously described, for the purpose of driving the left hand traction wheel 25.

The transverse member 22 preferably comprises a plurality of tubular elements telescopically arranged and includes a pair of coaxial outer sections 75 and 76, the former extending toward the right hand side member 21 and the latter extending in the opposite direction (Figure 3). The inner ends of the tubular sections 75 and 76 are spaced apart by the interposition of the differential gear casing 70, to which the inner ends of the members 75 and 76 are rigidly connected. The outer end of the member 75 terminates short of the right hand side member 21 and the outer end of the member 76 is similarly associated with the left hand side member 20. These outer ends of the members 75 and 76 are respectively associated with the side members 21 and 20 in a manner providing a flexible or articulate connection to accommodate vertical flexing of the frame members as the wheels encounter varying ground contour. Inasmuch as the connections at both ends of the member 22 will be the same only one will be described, and in this respect reference will be had again to Figure 3. The member 75 carries telescoped therewithin an inner tubular member 77 the outer end of which terminates against the inner face of the right hand side member 21 and surrounding an opening 78 formed in the latter to accommodate the shaft 68. The tubular member 77 may be non-rotatable with respect to the associated member 75 and thus provides a bearing on a transverse axis for a short sleeve 79 having a flange welded, as at 80, or otherwise appropriately secured, to the inner face of the side member 21. A thrust bearing or washer 81 is interposed between the inner end of the sleeve or collar 79 and the outer end of the member 75. The member 21 is thus carried by the member 22 for pivotal movement about a transverse axis which is the axis of the member 22. The other side member 20 is carried at the outer end of the other tubular section 76 in a manner similar to that just described and that side member is similarly mounted for pivotal movement about the transverse axis of the member 22, thereby imparting flexibility to the components of the frame so that the side members may have relative movement respectively in longitudinal, generally vertical planes.

The outer end of the axle 68 extends through an opening 82 provided in the outer side wall of the side member 21 and is threaded to receive thereon a nut 83 for the purpose of preventing lateral displacement between the members 21 and 22. A similar arrangement is provided at the other end of the member 22 for connecting that member to the left hand side member 20. In this respect it will be understood that the inner ends of the shafts 68 and 71 are non-displaceably carried by the differential carrier 69.

Figure 2:
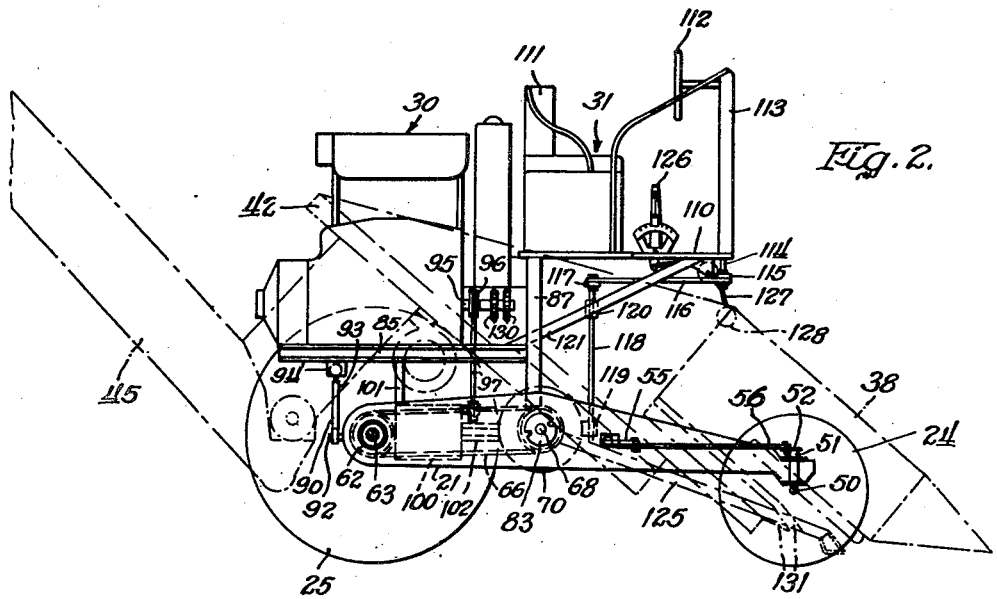
Figure 2 is a side elevational view of the frame structure.

The power plant 30 is provided with a pair of longitudinally running parallel frame members 85 (Figure 4), each in the form of an outwardly facing channel. These members are appropriately interconnected, as at 86, at their rear ends; and are connected at their forward ends to a pair of vertically extending supports 87, only one of which is shown in Figure 2. The lower end of each member 87 may be rigidly carried in any appropriate manner on an intermediate portion of the transverse structure 22, and the upper end of each member suitably carries a lower portion of the operator's station 31, the details of which will be set forth subsequently. This construction provides for the supporting at least in part of the power plant 30 on the transverse structure 22. The power plant is also supported in part by means of a cross connection between the side members 20 and 21. This means includes a transverse supporting bar 90 provided at each of its opposite end portions with a laterally extending slot 91. These slots respectively engage pins or studs 92 respectively carried by the side frame members 20 and 21. That portion of the transverse bar 90 intermediate its ends is curved upwardly at 93 to provide a portion in proximity to the transverse member 86 of the power plant support. This portion 93 is suitably connected by means including a ball and socket joint 94 to the transverse member 86. The transverse bar 90, because of its connections 91—92 and the ball and socket joint 94, may have free vertical movement within limits as the side members 20 and 21 oscillate vertically about their mounting on the transverse member 22, the bar or member 90 at the same time continuing to support the rear overhanging portion of the power plant 30.

The power plant 30 includes a power source comprising a forwardly extending driving shaft 95 which in the present case is a forward extension of the engine crank shaft (Figure 2). This shaft has keyed thereto a driving pulley 96 about which is trained a driving belt 97. The belt is also trained about a pulley 98 (Figure 3) carried on a short longitudinally extending shaft 99 which extends into a gear housing 100. This housing may contain conventional change-speed gearing, the components of which are not shown since they form no particular part of the present invention. The change-speed gear housing 100 is appropriately supported in part by depending supports 101 from the longitudinal power plant supporting members 85. The housing 100 includes as a rigid part thereof a forwardly extending housing portion 102 which is connected at its forward end to a rear portion of the differential gear housing 70. This portion 102 encloses and journals a forwardly extending power shaft 103 on the forward end of which is keyed a bevel pinion 104. The pinion 104 is in constant mesh with a bevel ring gear 105 appropriately associated with the differential gear mechanism 69. The mechanism just described completes the driving connection between the power plant 30 and the traction wheels 25 and 26. It will be remembered from the description that has gone before that most of this driving mechanism is enclosed, partly by the members 20, 21 and 22 and partly by the housings 70, 100 and 102.

The operator's station 31 includes a longitudinally forwardly extending horizontal platform 110 which carries a seat 111 behind a steering wheel 112. The steering wheel is appropriately supported by a vertical supporting structure 113 which serves to enclose a vertical steering shaft 114, the lower portion of which is visible in Figure 2. The lower end of the shaft 114 has keyed thereto a transversely extending arm 115 which is connected by a link 116 to an arm 117 keyed to the upper end of a vertical shaft 118. The shaft 118 may be journaled adjacent its lower end by a bearing 119 suitably carried on a forward portion of the differential gear housing 70 and may be additionally supported by a bearing 120 carried on a forwardly and upwardly inclining brace 121 between the power plant supporting structure 85 and the platform 110. The lower end of the steering shaft 118 has keyed thereto a forwardly extending arm 122 (Figure 1) which is suitably connected to the transverse tie rod 57 previously described. In this manner steering of the front wheels 23 and 24 is under control of an operator on the seat 111.

As previously stated, the transverse member 22 provides means for supporting an agricultural implement or machine, in the present case the picker units 35, 36, 37 and 38. In a case of this kind it is desirable that the picker units be so mounted as to have limited vertical movement to accommodate themselves to varying ground contour and it is preferable that this vertical movement be accomplished by means of a pivot on a transverse axis. Such means may be suitably employed to mount the picker units on the transverse member 22 and to this end each picker unit includes rearwardly and upwardly extending supporting structure in the form of angle bars, only one of which appears in Figure 2, connected at their rear ends to the transverse member 22. The structure just referred to is designated generally by the numeral 125 in Figure 2 and has not been set forth in greater detail inasmuch as it may assume many forms, all well known to those skilled in the art. It is also desirable that the gathering points of the picker units be raised for the purpose of transporting the vehicle and implement. For this purpose lifting and lowering means is provided, here shown as including a hand lever 126 suitably carried on the platform 110 and extending therebelow for association with cable and pulley means 127, the latter means being connected to a transverse pipe 128 which joins the picker units 35, 36, 37 and 38, so that all the picker units may be raised and lowered as a unit by means of the hand lever 126.

The vehicle is further adapted for the mounting or attachment of implements by the inclusion of means for driving moving parts of such implement or machine. To this end the power plant 30 includes a power source or power take-off, here shown as comprising a pair of sprockets 130 keyed on a forward extension of the power plant shaft 95 (Figures 1 and 2). In the present instance the picker is shown as including the usual snapping rolls, here designated by the numeral 131 (Figure 2) which may be connected in any suitable manner to the power take-off sprocket 130. Many examples of such driving connections are well known to those skilled in the art and it is felt that no illustration is required in the present case.

The modified form of the vehicle frame structure of Figure 5 differs from that previously described only with respect to the transverse member 22 and the means for driving the traction wheels 25 and 26. Accordingly, similar reference characters will be employed in so far as is consistent with clarity and new reference characters will be applied to substitute parts.

The vehicle frame of Figure 5 is shown as including the left and right hand side members 20 and 21 carried respectively on the wheels 23 and 25 and 24 and 26. In this case the members 20 and 21 are cross connected by a transverse member 135, preferably in the form of a transverse tube. The left hand end of the member 135 may be rigidly secured, as by welding or otherwise, to the left hand side member 20, the connection being designated at 136. The right end of the member 135 passes through the inner and outer walls of the side member 21, which are appropriately apertured at 137 for that purpose. The connection is such as to provide a bearing on a transverse axis between the member 21 and the right hand end of the tube 135, the connection further including a pair of collars 138 for increasing the efficiency of the bearing and for preventing lateral displacement of the member 21 with respect to the member 135.

The power plant 30 of this modification is similar to the power plant 30 previously described, with the exception that it includes different change-speed gear and differential gear housings. The change-speed gear housing of the modification is designated by the numeral 140 and the differential gear housing is indicated at 141. It will be noted that these two housings are reversed in location with respect to the housings 70 and 100 of the modification previously described, and in this case the differential gear housing 141 is in substantial transverse alignment with the axes of rotation of the traction wheels 25 and 26. The change-speed gear housing encloses and journals a rearwardly extending power shaft 142 which has keyed thereto a bevel pinion 143 in constant mesh with a bevel ring gear 144. The latter element is appropriately associated with differential gear mechanism 145 including oppositely extending shafts 146 and 147, the former extending to the right and the latter to the left. A flexible drive connection is provided between the shaft 146 and the right hand traction wheel 26 and a similar flexible drive connection is established between the shaft 147 and the left hand traction wheel 25. The right hand driving connection includes a transversely extending shaft 148 connected at its inner end by a universal joint 149 to the shaft 146 and at its outer end by a universal joint 150 to an axle shaft 151 which has been substituted for the corresponding axle shaft 63 of the modification described above. The left hand driving shaft 147 is connected by a universal joint 152 to a transversely extending power shaft 153 connected at its opposite end by a universal joint 154 to an axle shaft 155 which has been substituted for the axle shaft 61 of Figure 1. The universal joints 149, 150, 152 and 154 provide for flexibility of the driving mechanism as the side frame members 20 and 21 oscillate vertically with respect to each other about the pivot provided by the bearing structure 137—138 at the right hand side of the frame.

The change speed gear housing 140 may be suitably supported from the transverse member 135 by a pair of longitudinally extending transversely spaced apart frame bars 156 which are rigidly secured to a short sleeve 157 carried by the member 135. The differential gear housing 141 may be suspended from the power plant supporting structure 85 in a manner similar to the supporting means 101 of Figure 2. The power plant is supported by means of the transverse bar 90 shown in Figure 4.

Except as set forth above, the two modifications of the invention are very similar and the attributes of one are present in the other. The modification of Figure 5 may carry the picker construction of the other modification and the operator's station thereof may be of similar design. Likewise, the steering control linkage previously described may be installed in the modification of Figure 5 and it should be assumed that such construction is present for the purposes of completing an operative disclosure of the second modification.

In the use and operation of a vehicle patterned after either modification and equipped with any type of agricultural machine, considerable flexibility between the frame components is permitted because of the flexibile connection between such components, and no undue strain will be applied to the parts. Accordingly, the structure may be simple and light in weight, thus contributing to the economy of manufacture and ease of use. Either of the transverse members 22 or 135 provides an ideal location for the attachment or mounting of implements or machines, inasmuch as such structure may be disposed between the side members 20 and 21 and in a position where operation thereof may be easily viewed by an operator at the station 31. In either case the power plant is appropriately supported on the frame and is not subject to twisting forces resulting from variations in or flexing of the frame as the wheels encounter varying ground contour. The location of the power plant behind the operator's station is advantageous inasmuch as it does not interfere with the operator's vision forwardly. The power plant serves the dual purpose of supplying power for the traction wheels 25 and 26 and also, by means of the power take-off sprockets 130, supplying available power for use in driving moving parts of the implement. In this respect the modification of Figure 5 should be considered as including the power take-off sprockets 130.

It is important to note, in both forms of the invention, that the weight of the vehicle, even without the implement or harvester, is concentrated on the traction wheels, which is as it should be, especially in cases where the vehicle carries corn harvesting machinery. Also, of further importance is the general construction of the torque member 22, which takes the torque reaction of the engine, particularly under difficult operating conditions.

Various other features and objects of the invention will occur to those skilled in the art, as likewise will many modifications and alterations in the preferred forms of the invention illustrated. It is therefore not desired to limit the invention by the precise details of structure disclosed.

I claim:

1. A self-propelled vehicle, comprising: a frame having front and rear ends and including a pair of longitudinal, transversely spaced apart side members and a transverse member having opposite ends provided with means respectively connected to intermediate portions of the side members, said means including provision for articulation of one of the side members relative to the other in a longitudinal vertical plane; a plurality of means supporting the side members from the ground, one of said means including a traction element; a power unit extending longitudinally of the frame and having one end adjacent and supported on an intermediate portion of the transverse member and its other end generally transversely alined with the proximate ends of the side members at one end of the frame; and a second transverse member having opposite ends provided with means respectively connected to said side member ends and an intermediate portion having means supporting said other end of the power plant, at least one of said end-connecting means and said power-unit-supporting means including provision for the aforesaid relative articulation of the side members.

2. The invention defined in claim 1, further characterized in that: the power unit has an internal combustion engine at a level above the first transverse member; a power-transmission means in depending relation to the engine and positioned between and supported by the first and second transverse members.

3. The invention defined in claim 2, further characterized in that: the first transverse member carries a transversely extending drive element; means connects the drive element to the traction element; and the power-transmission means has a supporting connection to the first transverse means including a housing containing a drive connection from said power-transmission means to said drive element.

4. A self-propelled vehicle, comprising: a frame having front and rear ends and including a pair of longitudinal, transversely spaced side members having opposite end portions provided with rigid suspension means for ground-engaging wheels, and a transverse member of rigid construction interconnecting said side members intermediate their ends for relative articulation of the side members in generally parallel, longitudinal, vertical planes; a power unit substantially centered on the transverse member and extending longitudinally toward one end of the frame; a second transverse member supported at its opposite ends on the ends of the side members at said one end of the frame and including provision of the aforesaid articulation of the side members and further including means intermediate its ends for supporting the power unit; and drive means extending laterally outwardly from opposite sides of the power plant toward and connected to proximate wheels, said drive means including articulated parts for accommodating the aforesaid articulation of the side members.

5. An agricultural vehicle, comprising a frame carried on wheels and having generally the form of an H made up of a plurality of members respectively providing the legs and crossbar of the H and flexibly interconnected to accommodate vertical flexing of the frame as the wheels encounter varying ground contour; a power plant extending normally from the crossbar member and between the leg members; means carrying the power plant in part on the crossbar member; a transverse member extending between the leg members and spaced from the crossbar member in the direction that the power plant extends; means articulately connecting the transverse member at its opposite ends respectively to the leg members; and means intermediate the ends of the transverse member and articulately associated with the power plant for supporting the power plant in part on the transverse member.

6. The invention defined in claim 5, further characterized in that: a pair of wheels are transversely alined generally in the transverse plane of said transverse member; the power plant includes a power-transmitting element substantially in transverse alinement with said pair of wheels; and a pair of flexible drive elements extend respectively laterally oppositely from the power-transmitting element and are connected respectively to the wheels of said pair of wheels.

DANIEL C. HEITSHU.

REFERENCES CITED

The following references are of record in the file of this patent:

UNITED STATES PATENTS

| Number | Name | Date |
| --- | --- | --- |
| 1,731,837 | Wood | Oct. 15, 1929 |
| 2,083,085 | Palmer | June 8, 1937 |
| 2,106,541 | Tjaarda | Jan. 25, 1938 |
| 2,152,273 | Otto | Mar. 28, 1939 |
| 2,228,454 | Hamilton | Jan. 14, 1941 |
| 2,378,615 | Brown | June 19, 1945 |